United States Patent Office 3,032,459
Patented May 1, 1962

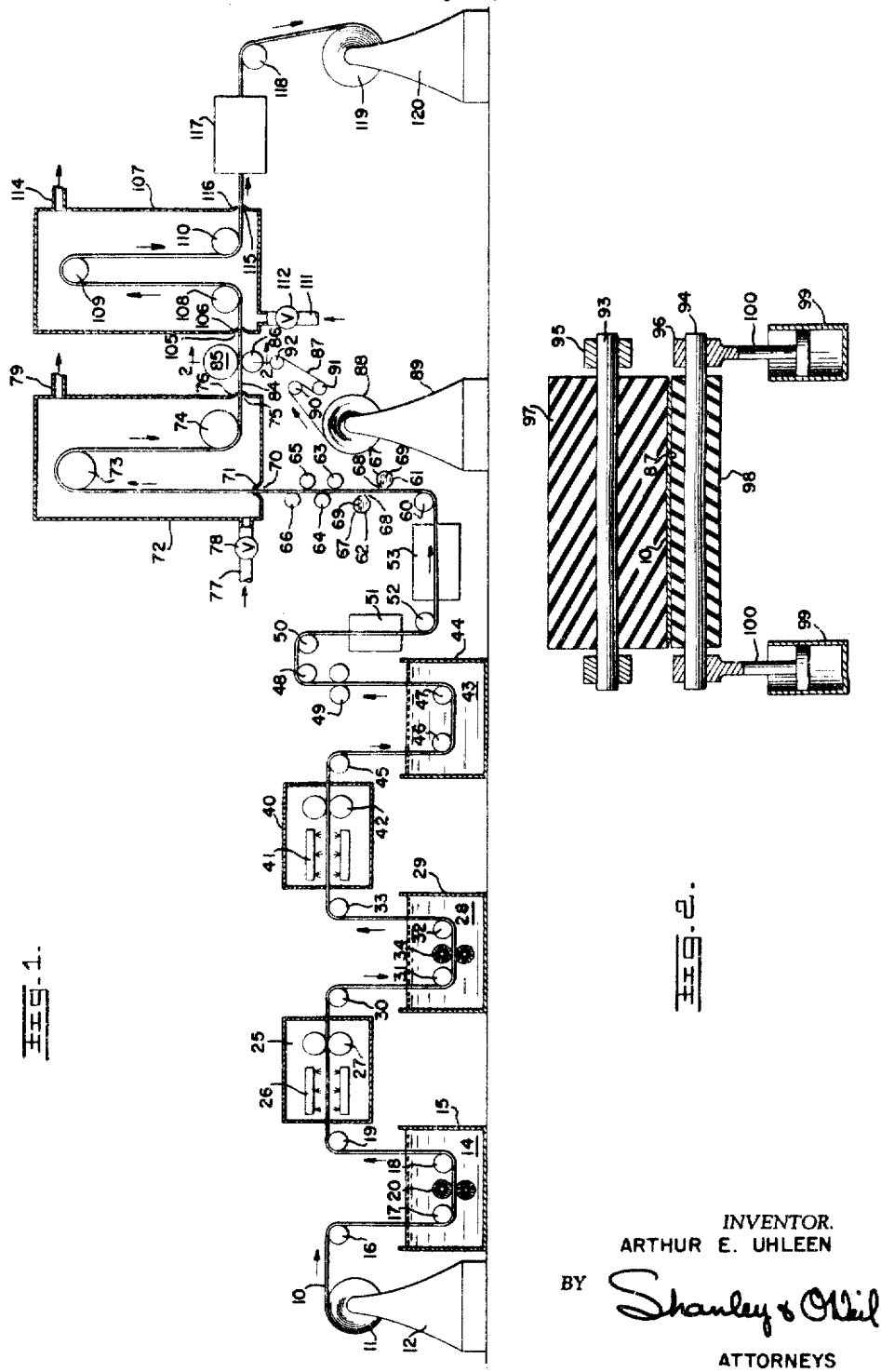

3,032,459
METHOD OF COATING SHEET MATERIAL
Arthur E. Uhleen, Allentown, Pa., assignor to National Steel Corporation, a corporation of Delaware
Filed May 13, 1958, Ser. No. 734,995
19 Claims. (Cl. 156—278)

This invention relates to a novel method of applying organic film material and an organic finish to sheet material, and in one of its more specific embodiments, the invention further relates to a novel method of applying a tightly adhering vinyl film to one side of metal sheet material and a hardened organic finish to the other side of the metal sheet material.

Heretofore, when it was desired to produce metal sheet material provided with an organic film on one side and an organic finish on the other side, it was necessary to apply the coating of organic finish composition and the coating of adhesive composition for the organic film during separate operations and use a heating step following application of each of the two compositions since, among other reasons, the heat-conditioning cycles for the adhesive composition and the organic finish composition could not be controlled readily in accordance with prior art practice to produce a heat-hardened coating of organic finish at the time the coating of adhesive composition was cured and ready for application of the organic film. The prior art practice, which required two separate steps for application of the various compositions and two heating steps, was not only inefficient and uneconomic in commercial practice, but it often caused either the adhesive composition or the organic finish to be subjected to a longer period of heat treatment than desirable for optimum results. This, in turn, generally was found to produce either a hardened coating of the organic finish which was extremely hard and brittle, or the coating of adhesive was over-cured and the resultant bond between the organic film and the metal was not sufficiently pliable for strenuous forming operations. Thus, the product was not generally satisfactory nor commercially successful.

In accordance with one embodiment of the present invention, tightly adhering organic film material and a hardened organic finish may be applied to sheet material using a novel and improved method requiring only one coating operation and one heating step. This may be accomplished by applying to separate areas of the sheet material a coating of an adhesive composition and a coating of an organic finish composition selected in accordance with the invention, the coating of organic finish under the conditions described herein being heat-hardenable during the heat-curing cycle for the coating of adhesive. Then, the coating of adhesive composition may be heat-cured and the coating of organic film heat-hardened during a single heat treatment step and the organic film is applied to the cured adhesive coated surface of the sheet material without damage to the hardened organic finish. When operating in accordance with preferred practice, the coating of adhesive composition and the coating of organic finish both receive an optimum heat-conditioning treatment which results, among other things, in a pliable, formable tightly adhering organic film and hardened organic finish. The present invention thus produces a product which is outstanding in its ability to withstand strenuous forming operations without damage to either the organic film or the organic finish.

It is an object of the present invention to provide a novel method of applying organic film material and an organic finish to sheet material.

It is a further object of the present invention to provide a novel method of applying vinyl film and an organic finish to heat-resistant sheet material.

It is still a further object of the present invention to provide a novel method of applying a tightly adhering organic film and a hardened organic finish to metal sheet material.

It is still a further object of the present invention to provide a novel method of applying a tightly adhering vinyl film and a hardened organic finish to metal sheet material such as ferrous metal strip.

It is still a further object of the present invention to provide a novel method of applying a tightly adhering organic film material and a hardened organic finish to metal sheet material wherein the coating of adhesive composition for the organic film may be heat-cured and the coating of organic finish composition may be heat-hardened during a single heating cycle in a zone maintained at a suitable elevated temperature.

It is still a further object of the present invention to provide a novel method of applying a tightly adhering vinyl film and a hardened organic finish to ferrous metal strip wherein the coating of adhesive composition for the vinyl film may be heat-cured and the coating of organic finish may be heat-hardened during a single heating cycle in a zone maintained at a suitable elevated temperature.

It is still a further object of the present invention to provide an improved metal laminate product which is produced in accordance with the method of the invention.

Still other objects and advantages of the present invention will be apparent to those skilled in the art upon reference to the following detailed description and the drawings, wherein:

FIGURE 1 is an elevational view diagrammatically illustrating suitable apparatus for use in practicing the present invention; and FIGURE 2 is an enlarged cross-sectional view taken along the line 2—2 of FIGURE 1.

Referring now to the drawings and more particularly to FIGURE 1, ferrous metal strip 10 may be fed from a coil 11 rotatably mounted on pedestal 12 through cleaning solution 14 contained in tank 15 via a path established by guide rolls 16, 17, 18 and 19. While within tank 15, the ferrous metal strip 10 is vigorously scrubbed by means of driven brushes 20 and given a prior art treatment for the removal of organic and inorganic foreign substances on the strip surface such as rolling mill oils and metal oxides. The solution 14 may contain a suitable alkaline substance in effective concentration for the removal of foreign substances from the surface of ferrous metal strip such as caustic soda, sodium orthosilicate and trisodium phosphate. In addition, the solution also may contain a detergent to aid in the removal of foreign substances from the strip surface, particularly oils or other organic substances. Treatment for a period of about 10 seconds to 1½ minutes at a solution temperature of about 130–190° F. generally is satisfactory, but usually treatment for a period of about 10–20 seconds at a solution temperature of about 155–165° F. is preferred.

After treatment in tank 15, the ferrous metal strip 10 is withdrawn and passed through rinsing unit 25 where it is rinsed thoroughly by means of water sprays 26 and excess water is removed from the rinsed surface by squeegee rolls 27. The strip 10 then may be passed through a solution 28 in tank 29 via a path established by guide rolls 30, 31, 32 and 33. While within tank 29, the ferrous metal strip 10 may be vigorously scrubbed by means of driven brushes 34 and treated in an acidic solution containing a substance which is a suitable source of phosphate ion for the purpose of removing additional foreign substances from the strip surface such as oxides of iron and/or depositing a light phosphate-containing film. This treatment improves corrosion resistance and provides a surface characterized by good bonding properties for heat-hardenable organic finishes such as industrial paints, lacquers or enamels. The solution 28 may be, for example, a ½–5% aqueous solution of phosphoric acid, but a 1–3% aqueous solution of phosphoric acid which also contains a suitable detergent to aid in the removal of foreign substances from the strip surface usually is preferred. Treatment of the strip 10 for a period of about 10 seconds to 1½ minutes at a solution temperature of 130–190° F. generally is satisfactory, but usually treatment for a period of about 10–20 seconds at a solution temperature of about 155–165° F. is preferred.

After treatment in tank 29, the ferrous metal strip 10 is withdrawn and passed through rinsing unit 40 where it is rinsed thoroughly by means of water sprays 41 and excess water is removed from the rinsed strip surface by squeegee rolls 42. The strip 10 then may be passed through a solution 43 in tank 44 via a path established by guide rolls 45, 46, 47 and 48 and squeegee rolls 49. While within tank 44, the ferrous metal strip 10 may be treated in an acidic aqueous solution containing a substance which is a suitable source of chromate ion for the purpose of controlling the amount of phosphate-containing film deposited on the strip surface, removing additional foreign substances and excess iron salts from the strip surface, and passivating the strip surface to render it more corrosion resistant. The solution 43 may be, for example, an aqueous solution containing about 2–10 ounces of chromic acid ($CrO_3$) for each 400 gallons of solution, but usually an aqueous solution containing about 3–4 ounces of chromic acid and phosphoric acid for each 500 gallons of solution is preferred. Treatment for a period of about 10 seconds to 1½ minutes at a solution temperature of about 130–190° F. generally is satisfactory, but usually treatment for a period of about 10–20 seconds at a solution temperature of about 155–165° F. is preferred.

After treatment in tank 44, the ferrous metal strip 10 is withdrawn and passed through squeegee rolls 49 to remove excess solution 43 adhering to the strip surface and it is then passed over guide rolls 48 and 50 and through dryer 51. The strip 10 may be heated to a temperature of about 130–190° F. and the surface of the strip thoroughly dried in dryer 51. The resulting pretreated ferrous metal strip 10 has a clean surface which, preferably, is characterized by good resistance to corrosion and good bonding properties for heat-curable industrial adhesives or heat-hardenable organic finishes such as industrial paints, lacquers and enamels. Preferably, the phosphate content of the phosphate-containing film resulting from the pre-treatment should be substantially below 200 mgs./100 sq. ft. and generally it should not exceed about 100 mgs./100 sq. ft. For best bonding properties with ferrous metal, usually the phosphate film should contain about 5–10 mgs. of phosphate/100 sq. ft.

While a presently preferred pre-treatment of ferrous metal strip has been specifically described above, it is expressly understood that pre-treatment of ferrous metal strip to be further processed in accordance with the invention is not limited thereto. In general, any suitable pre-treatment may be used which results in a clean, attractive metallic surface characterized by good corrosion resistance and good organic finish and adhesive bonding properties. Usually, such pre-treatments will comprise a suitable wet treatment for removal of foreign substances from the metal surface, followed by treatment in at least one solution containing phosphate and/or chromate to provide a passivated surface provided with a phosphate film and characterized by good corrosion resistance and improved organic finish and adhesive bonding characteristics. For metals other than ferrous metal, such a pre-treatment may differ somewhat for the pre-treatment specifically described above for ferrous metal. For example, when the metal is aluminum, the pre-treatment may comprise treatment in an alkaline solution at 130–190° F. to remove foreign substances from the metal surface, followed by an aqueous rinse and treatment in a dilute aqueous solution containing phosphoric acid and chromic acid at a temperature of 130–190° F. to passivate the surface, improve bonding characteristics, and remove additional foreign substances from the metal surface. Also, where the metal to be pretreated is galvanized ferrous metal, tinplate, etc., the metal may be given a pre-treatment to remove oils and other foreign substances from the metal surface, followed by treatment in an aqueous solution containing a small amount of chromic acid.

The pre-treated ferrous metal strip 10 is withdrawn from dryer 51, passed under guide roll 52, and then passed through unit 53 wherein the temperature of the strip is adjusted within limits to be fully discussed hereinafter. The temperature-adjusted strip 10 is passed under roll 60 and upward past adhesive composition and organic finish composition applicators 61 and 62, leveling rolls 63 and 64, and metering rolls 65 and 66 to thereby provide one side of the strip 10 with a uniform coating of adhesive of a closely controlled desired thickness and the opposite side of the strip 10 with a uniform coating of organic finish which is likewise of a closely controlled desired thickness.

The applicators 61 and 62 preferably are of the type disclosed in United States Patent 2,784,697, issued March 12, 1957, to Arthur E. Uhleen; while a presently preferred construction for leveling rolls 63 and 64 and metering rolls 65 and 66 and method of applying a coating of the organic finish composition and adhesive composition are disclosed in application Serial No. 516,168, filed June 17, 1955, on behalf of Arthur E. Uhleen, and entitled "Method of Coating Strip Materials With Paints or Enamels." The applicators disclosed in United States Patent 2,784,697 are so designed as to be capable of depositing fluid coating materials by a modified flow-type process wherein pools of a fluid coating material of predetermined size are maintained in contact with opposite sides of metal strip 10. The applicators 61 and 62, which are located on opposite sides of the strip 10, each may comprise an elongated hollow body member 67 positioned transversely of the metal strip 10 and each may be provided with a longitudinal nozzle 68 disposed so as to discharge against one side of the metal strip 10 and across its width. The hollow body member 67 of each applicator is fed with its respective fluid coating material 69 under pressure by means not shown to insure uniform discharge of the fluid coating material, i.e., the adhesive composition or the organic finish composition, through the nozzle 68 and across the width of the metal strip 10. Preferably, the adhesive and organic finish compositions are substantially completely homogenized and heated to a temperature approaching but less than the temperature of their respective flash points. in addition, preferably the strip 10 is heated or cooled, as necessary, in unit 53 to a temperature closely approximating the lower flash point of the two compositions. The temperature of strip 10 and the adhesive and organic finish compositions at the point of their application thereto may vary over a considerable range within the above described limits, but usually the temperature should be about 150–200° F. and, preferably, about 160–165° F. The leveling rolls 63 and 64 are positioned above the applicators 61 and 62 on either side of the metal strip 10 and are adapted to contact the metal strip 10 and cause a lateral displacement of adhesive or organic finish composition in such a manner as to perform a "leveling" operation; while metering rolls 65 and 66 are adapted to contact the metal strip 10 after leveling rolls 63 and 64 and control the quantity of adhesive or organic finish composition remaining on the surfaces of the strip. The preferred thickness of the coating of adhesive composition may vary over a considerable range depending, at least in part, upon the nature of the specific adhesive composition used, the viscosity of the applied adhesive composition, the surface upon which it is applied and the nature of the organic film material to be applied to the metal surface. However, usually the coating of adhesive composition preferably should be approximately 0.0005–0.001 inch in thickness, while the thickness of the coating of organic finish may vary substantially for reasons similar to those mentioned above for the adhesive composition but usually it should be about 0.0001–0.001 inch in thickness for preferred results.

After receiving coatings of the adhesive and organic finish compositions, the ferrous metal strip 10 is passed upward through entrance 70 provided with strip sealing means including flaps 71 into oven 72, and through oven 72 via a path established by guide rolls 73 and 74. The strip 10 is then withdrawn via exit 75 provided with strip sealing means including flaps 76. While the strip 10 is shown as making only one pass in oven 72 for the purpose of simplifying the drawings, it is understood that it may make a plurality of passes to thereby increase the residence time within oven 72 at a given strip speed when it is so desired. The oven 72 may be heated by means of a hot gaseous heating medium supplied thereto via conduit 77 including control valve 78 at a controlled rate and temperature to maintain a desired temperature range within oven 72, while cooled gaseous heating medium is withdrawn from oven 72 via conduit 79. The hot gaseous heating medium preferably is supplied to and withdrawn from oven 72 at a rate at least sufficient to dilute the solvent vapors flashed off therein while heat-curing the coating of adhesive composition and heat-hardening the coating of organic finish composition to thereby maintain a non-explosive atmosphere within oven 72.

While the ferrous metal strip 10 is within oven 72, the solvent content of the coating of adhesive composition, which preferably is applied by applicator 61, is flashed off and the resulting thin coating of adhesive is heated to a temperature sufficiently high and for a period of time so as to cause the adhesive to be soft and receptive to the flexible organic film to be described hereinafter at the time it is applied to the strip 10, and to assure a good adherent bond between the organic film and the metal strip. In addition, the metal strip 10 may be heated to a temperature sufficiently high to assure fusion of the organic film material thereto during its application under pressure and thus tightly adhere the organic film material to the metal strip, or aid therein. The coating of organic finish composition, which preferably is applied by applicator 62, must be sufficiently heat-hardened during the heat-curing or heat conditioning of the coating of adhesive composition and metal strip above described so as to not be removed during application of the organic film to the metal strip, and yet not be overcured sufficiently to result in a brittle film of hardened organic finish on the final product.

Preferably, at least, the roll 73 in oven 72 is of the type disclosed in application Serial No. 612,783, filed September 28, 1956, for "Transport Roller," on behalf of Arthur E. Uhleen. When using rollers in oven 72 of the type described in the above application, the freshly coated ferrous metal strip 10 does not contact the rolls 73 and 74 with the exception of a narrow edge portion along either side of the strip which engages annular raised shoulders on either end of the roll. This prevents contact of the strip with the roll other than on the edges of the strip and the accompanying marring of the freshly coated surfaces.

The ferrous metal strip 10 is withdrawn from oven 72 and passed between back-up roll 85 and pressure roll 86. A flexible organic film material 87, which may be of a width substantially that of strip 10, may be fed from coil 88 rotatably mounted on pedestal 89 between back-up roll 85 and pressure roll 86 at a rate substantially corresponding to the speed of strip 10 and in such a manner so as to be applied to the heat-cured adhesive-coated side 84 of strip 10. Preferably, the organic film 87 to be applied is passed over leveling and tensioning rolls 90, 91 and 92 for the purpose of leveling the organic film, removing wrinkles therefrom, and providing slight tension therein so as to assure uniform application.

Referring now to FIGURE 2, which is a detailed diagrammatic view taken along the line 2—2 of FIGURE 1, the metal shafts 93 and 94 of back-up roll 85 and pressure roll 86 are rotatably mounted on mounting means including bearings 95 and 96, respectively. The rolls 85 and 86 are provided with rubber coverings 97 and 98, respectively. Hydraulic cylinder assemblies 99 including pistons 100 are arranged at either end of shaft 94 and adapted to urge pressure roll 86 in a direction toward back-up roll 85, and thus apply a predetermined pressure on the metal strip 10 and organic film 87 as they pass between rolls 85 and 86. The amount of pressure to be applied may vary depending upon the nature of the organic film material but, in general, the amount of pressure applied should be sufficient to cause the organic film 87 to be uniformly adhered or fused to the heat-cured adhesive coated surface of strip 10. However, the pressure should not be sufficiently high to cause embossing on the organic film 87 to be washed out or the organic film itself to be reduced below a desired thickness. The rolls 85 and 86 may apply a pressure of about 40–100 p.s.i. on the strip 10 and organic film but a pressure of about 75–85 p.s.i. is usually preferred.

After application of organic film material 87 to strip 10, the coated hot strip 10 is passed through entrance 105 provided with strip sealing means including flaps 106 into cooling unit 107, and then through cooling unit 107 via a path defined by rolls 108, 109 and 110. The strip 10 may be cooled while within cooling unit 107 to a temperature below the flow temperature of the adhesive and preferably to approximately room temperature by means of atmospheric air supplied thereto at a controlled rate via conduit 111 including control valve 112, the warmed air being removed therefrom via conduit 114. In addition, one or more of the rolls 108, 109 and 110 may be of the refrigerated type, if desired. The cooled strip 10 is withdrawn from cooling unit 107 via exit 115 provided with strip sealing means including flaps 116 and it may be passed to slitter 117 where the edges of the trip 10 are trimmed and, if desired, the strip 10 may be cut into a plurality of widths. The strip 10 then passes over guide roll 118 and onto coil 119 which is rotatably mounted on pedestal 120.

The flexible organic film 87 which may be applied to a heat resistant substrate in accordance with the invention may be any of a large number of suitable materials such as thermoplastic "vinyl" resin film, including vinyl chloride film as well as vinyl chloride film modified with other ingredients, such as by copolymerizing therewith vinylidene chloride or vinyl acetate, or vinyl chloride polymers modified with added material such as acrylonitrile-butadiene copolymers. The vinyl film may be plasticized, and/or it may contain suitable pigments, fillers, etc., or little or none of these substances may be present. Films of methyl methacrylate polymers, cellulose acetate or cellulose nitrate fabric-backed films, or synthetic rubber-based materials, preferably in strip form, also may be used. The term "film" as used in the specification and claims is intended to include suitable flexible materials in sheet form which may be referred to in the art as "sheet," as well as materials referred to as "film." These materials are generally classified in accordance with their thicknesses, with sheet materials usually being defined as materials having a thickness of 0.008 inch or greater, and with film being defined as materials having a thickness less than 0.008 inch. In general, films as thin as 0.004 inch may be deposited satisfactorily in accordance with the invention, and films many times as thick may be used, if desired. Preferably, the film should have a thickness of about 0.004–0.020 inch and it may be embossed or plain. The preferred organic film material is vinyl film. Vinyl films having a thickness of about 0.008 inch have been found to give excellent results.

The preferred adhesive composition to be used in the present invention will vary somewhat with the nature and composition of the organic film material. Generally, the adhesive composition may be a heat-curable adhesive composition including suitable thermoplastic resins, thermosetting or "heat-conditionable" resins which are useful as adhesives and, preferably, such resins should be relatively high temperature material. A large number of suitable adhesive compositions are known to the art and usually specific adhesives are preferred for a given type of organic film material. For example, a number of very satisfactory adhesive compositions for vinyl film are disclosed in United States Patent 2,329,456, issued September 14, 1943, to William E. Campbell, Jr. The specific adhesive composition selected should have a heat-curing cycle with the temperature of heating and the period of heating during the cycle being such as to flash off solvent and render the resulting film of adhesive soft and pliable with good adhesive properties, and with the temperature and period of heating during the cycle being such as to allow the organic finish to heat-harden without the organic finish being over-cured. In addition, the heat-curing cycle and/or the adhesive properties should be such as to allow sufficient time for the metal strip to reach a preferred temperature without over-curing the adhesive which often is a temperature slightly below the temperature at which embossing is washed out when a thermoplastic film is being applied. With heavier metal substrates, the required period of heating at the given temperature to reach a desired metal temperature is greater than with thinner metal substrates.

The organic finish will depend at least to some extent upon the heat-curing cycle for the particular adhesive composition selected since the coating of organic finish composition must be cured at the time when the strip 10 is passed between rolls 85 and 86 and the organic film applied thereto. Otherwise, the coating of organic finish will be marred or completely removed. In addition, the organic finish selected preferably should not over-cure during the heat-curing cycle for the coating of adhesive composition and heat-conditioning strip 10 since it would then be brittle and have unsatisfactory forming characteristics. Preferably, the particular heat-hardenable industrial paint, lacquer, varnish, enamel, or other suitable industrial finish selected should be formulated to have a heat-hardening cycle closely approximating the heat-curing cycle for the adhesive composition selected. The heat-hardening cycle of organic finishes may be varied or controlled to a large extent by formulations and methods well known in the art and, in addition, further steps may be taken to reduce the heat-hardening cycle by pre-heating the metal strip 10, reducing solvent content, etc., such as herein practiced.

When vinyl film is being applied to ferrous metal sheet material having a thickness of about 0.01–0.04 inch, the oven 72 may be maintained at a temperature of about 400–650° F. with the residence time of the strip within the oven 72 being about 30 seconds to 2 minutes. Usually, it is preferred to operate at an oven temperature of about 500–525° F. and with a strip residence time within the oven of about 40–50 seconds. The strip temperature at the time of applying the vinyl film is of importance, and the strip temperature at the completion of heat-curing the adhesive composition and at the time of application of the vinyl film should be about 300–450° F. for satisfactory results. Best results are usually obtained at a strip temperature of about 375–425° F. at the time the vinyl film is applied. The vinyl film is applied to the strip surface having cured adhesive thereon, i.e., the adhesive is in a proper condition following the above discussed heat-curing cycle to receive and tightly adhere the organic film to the strip at a suitable strip temperature as above defined, and subjected to pressure. A satisfactory pressure is about 40–100 p.s.i., but a pressure of about 75–80 p.s.i. is usually preferred.

Specific examples of suitable organic films, adhesives and organic finish compositions which may be used are as follows.

TABLE I

*Organic Film Material*

Ingredient: Part by weight (A)

| | |
|---|---|
| Polyvinyl chloride (35,000 avg. mol. wt.) | 100 |
| Tricresyl phosphate | 15 |
| Dioctyl phthalate | 15 |
| Lead stearate | 1.5 |
| High molecular weight alcohol wax | 1.5 |
| Lead silicate | 5.0 |
| Lead phosphite | 1.5 |
| Stearic acid | 0.25 |
| Pigment | 5.0 |

(B)

| | |
|---|---|
| Polyvinyl chloride | 100 |
| Polyvinyl alcohol | 2 |
| Carnauba wax | 4 |
| Dibasic lead phosphite | 0.5 |
| Tribasic lead sulfate | 20 |
| Pigment | 10 |

TABLE II

*Adhesive Compositions*

Ingredient: Parts by weight (A)

| | |
|---|---|
| Polyvinyl acetate-chloride copolymer having the composition 12% polyvinyl acetate, 87% polyvinyl chloride and 1% maleic anhydride and a molecular weight of 10,000–15,000 | 11.3 |
| Polybutyl methacrylate | 13.1 |
| Polyisobutyl methacrylate | 5.6 |
| Butyl acetate | 21 |
| Methyl isobutyl ketone | 21 |
| Toluol | 14 |
| Propylene oxide | 3.5 |
| Ethyl acetate | 13.65 |

(B)

| | |
|---|---|
| Polyvinyl chloride-acetate (87/12) copolymer modified with 1% maleic anhydride | 10 |
| Acrylonitrile - butadiene rubbery copolymer (35/65) | 10 |
| Methyl ethyl ketone | 60 |
| Methyl isobutyl ketone | 20 |
| | 100 |

TABLE III

*Organic Finish Compositions*

Ingredient:

(A)

| | | |
|---|---|---|
| Titanium dioxide | parts by weight | 300 |
| Dehydrated castor oil alkyd resin | do | 450 |
| Melamine resin 50/50 | do | 150 |
| Xylol | do | 100 |
| Viscosity (Ford #4 cup at 80° F.) | seconds | 110 |

(B)

| | | |
|---|---|---|
| Titanium dioxide | parts by weight | 950 |
| Zinc oxide | do | 50 |
| Alkyd resin (#1) | do | 820 |
| Urea-formaldehyde resin (#4) | do | 820 |
| Xylol | do | 820 |
| Butanol | do | 546 |
| Petroleum naphtha (high solvency #40) parts by weight | | 1029 |
| Non-volatile content | percent | 52.8 |
| Viscosity (#4 Ford cup at 80° F.) | seconds | 22 |
| Pigment/binder ratio (by weight) | | 1/1.64 |

The product of the present invention is capable of being subjected to strenuous after-forming operations without damage to either the hardened organic finish or the tightly adhering organic film material. For example, the product of the present invention is capable of making a 180° seam or a "Pittsburgh lock" seam without damage. Thus, the process of the present invention is capable of producing a superior product and much more economically than heretofore possible.

While ferrous metal strip has been referred to in the foregoing specific description, it is expressly understood that other metals may be used such as aluminum, tinplate, zinc coated ferrous metal, etc. The foregoing materials may be in the form of flexible sheet or strip and of any suitable thickness. However, a thickness of about 0.010–0.040 inch is usually preferred. In addition, still other satisfactory heat resistant substances may be used.

It is expressly understood that the accompanying illustrative drawing, the foregoing detailed description and the following specific example are for purposes of illustration only, and are not intended as limiting to the spirit or scope of the appended claims.

EXAMPLE

Ferrous metal strip having a thickness of 0.020 inch was pretreated at 160° F. for 15 seconds with scrubbing in a sodium orthosilicate solution to remove foreign materials from the surface, followed by a water rinse and treatment at 160° F. for 15 seconds with scrubbing in a 2% phosphoric acid solution containing a detergent. The strip was then rinsed with water, treated for 15 seconds at 160° F. in a solution containing 4 ounces of phosphoric acid and chromic acid for each 500 gallons of solution, and dried at 160° F. to remove moisture from the strip surface.

The pretreated strip was heated to 165° F. and a 0.0007 inch coating of the adhesive composition "A" of Table II and a 0.0005 inch coating of the organic finish "A" of Table III were applied. The thus coated strip was heated in an oven maintained at a temperature of about 500–520° F. for a period of about 40–45 seconds to heat-cure the coating of adhesive and heat-harden the coating of organic finish. The strip was at a temperature of about 385–400° F. at the end of the heat treatment. A 0.008 inch vinyl film of composition "A" of Table I was applied immediately to the surface area of the strip having cured adhesive thereon under a pressure of 80–85 p.s.i. to tightly adhere the vinyl film to the strip. The resulting laminate was then cooled to room temperature using atmospheric air as the cooling agent.

The resulting product was subjected to strenuous forming operations without damage to either the hardened organic finish or the tightly adhering organic film.

What is claimed is:

1. A method of applying a tightly adhering organic film material and a hardened organic finish to heat resistant sheet material comprising applying a heat-curable adhesive composition for the organic film material on a first surface area of the sheet material, applying a film forming heat-hardenable liquid organic finish composition on a second surface area of the sheet material, the compositions of the organic finish and the adhesive being such that the liquid organic finish hardens to form a film during a heat-curing cycle for the adhesive composition, curing the adhesive and hardening the organic finish by heating the sheet material to an elevated temperature, applying organic film material on at least a portion of the surface area of the sheet material having cured adhesive thereon at elevated temperature and under pressure to adhere the organic film material to the sheet material, and cooling the sheet material.

2. A method of applying a tightly adhering organic film material and a hardenable organic finish to metal sheet material comprising applying a heat-curable adhesive composition for the organic film material on a first surface area of the metal sheet material, applying a film forming heat-hardenable liquid organic finish composition on a second surface area of the metal sheet material, the compositions of the organic finish and the adhesive being such that the liquid organic finish hardens to form a film during a heat-curing cycle for the adhesive composition, curing the adhesive and hardening the organic finish by heating the metal sheet material to an elevated temperature, applying the organic film material on at least a portion of the surface area of the metal sheet material having cured adhesive thereon at elevated temperature and under pressure to adhere the organic film material to the metal sheet material, and cooling the metal sheet material.

3. A method of applying a tightly adhering organic film material and a hardenable organic finish to metal sheet material comprising applying a heat-curable adhesive composition for the organic film material on a first surface area of the metal sheet material, applying a film forming heat-hardenable liquid organic finish composition on a second surface area of the metal sheet material, the compositions of the organic finish and the adhesive being such that the liquid organic finish hardens to form a film during a heat-curing cycle for the adhesive composition upon heating at a temperature of about 400–650° F., curing the adhesive and hardening the organic finish by heating the metal sheet material in a zone maintained at a temperature of about 400–650° F., applying the organic film material on at least a portion of the surface area of the metal sheet material having cured adhesive thereon at elevated temperature and under pressure to adhere the organic film material to the sheet material, and cooling the metal sheet material.

4. A method of applying a tightly adhering organic film material and a hardenable organic finish to metal sheet material comprising applying a coating of heat-curable adhesive composition for the organic film material on a first surface area of the metal sheet material, applying a film-forming heat-hardenable liquid organic finish composition on a second surface area of the metal sheet material, the compositions of the liquid organic finish and the adhesive being such that the organic finish hardens to form a film during a heat-curing cycle for the coating of the adhesive composition, the coating of adhesive composition being heat-curable when heated for a period of about 30 seconds to 2 minutes in a zone maintained at a temperature of about 400–650° F., curing the adhesive and hardening the organic finish by heating the sheet metal in a zone maintained at a temperature of about 400–650° F. for a period of about 30 seconds to 2 minutes, applying the organic film material on at least a portion of the surface area of the metal sheet material having cured adhesive thereon at elevated temperature and under pressure to adhere the flexible organic film material to the metal sheet material, and cooling the metal sheet material.

5. A method of applying a tightly adhering organic film material and a hardenable organic finish to metal sheet material comprising applying a coating of heat-curable adhesive composition for the organic film material on a first surface area of the metal sheet material, applying a coating of a film forming heat-hardenable liquid organic finish composition on a second surface area of the metal sheet material, the coating of adhesive composition being heat-curable when the metal sheet material is heated to a temperature of about 300–450° F., the compositions of the liquid organic finish and the adhesive being such that the organic finish hardens to form a film during a heat-curing cycle for the coating of adhesive composition, curing the coating of adhesive composition and hardening the coating of organic finish by heating the metal sheet material to a temperature of about 300–450° F., applying the organic film material on at least a portion of the surface area of the metal sheet material having cured adhesive thereon while the temperature of the metal sheet is about 300–450° F. and under pressure to adhere the organic film material to the metal sheet material, and cooling the metal sheet material.

6. A method of applying a tightly adhering organic film material and a hardened organic finish to ferrous metal sheet material comprising applying a passivating phosphate film having a thickness of about 3–100 mgs./100 sq. ft. on the ferrous metal sheet material, applying a coating of heat-curable adhesive composition for the organic film material on a first surface area of the ferrous metal sheet material, at least the first surface area having the phosphate film thereon, the ferrous metal sheet material having a thickness of about 0.010–0.040 inch and the applied coating of adhesive material having a thickness of about 0.0005–0.001 inch, applying a coating of a film-forming heat-hardenable liquid organic finish composition on a second surface area of the ferrous sheet material, the coating of adhesive composition being heat-curable when the ferrous metal sheet material is heated to a temperature of about 300–450° F., the compositions of the liquid organic finish and the adhesive being such that the coating of heat-hardenable organic finish hardens to form a film during a heat-curing cycle for the adhesive composition, curing the coating of adhesive and hardening the coating of organic finish by heating the ferrous metal sheet material to a temperature of about 300–450° F., applying organic film material having a thickness of about 0.004–0.020 inch on at least a portion of the surface area of the ferrous metal sheet material having cured adhesive thereon while at a temperature of about 300–450° F. and under pressure to adhere the organic film material to the sheet material, and cooling the ferrous metal sheet material.

7. A method of applying a tightly adhering organic film material and a hardened organic finish to metal sheet material comprising applying a coating of heat-curable adhesive composition for the organic film material on a first surface area of the metal sheet material, applying a coating of a film-forming heat-hardenable liquid organic finish composition on a second surface area of the metal sheet material, the adhesive composition being heat-curable when the metal sheet material is heated to a temperature of about 375–425° F., the compositions of the organic finish and the adhesive being such that the liquid organic finish hardens to form a film during a heat-curing cycle for the adhesive composition, curing the adhesive and hardening the organic finish by heating the metal sheet material to a temperature of about 375–425° F., applying organic film material on at least a portion of the surface area of the metal sheet material having cured adhesive thereon while the metal sheet is at a temperature of about 375–425° F. and under pressure to adhere the organic film material to the metal sheet material, and cooling the metal sheet material.

8. A method of applying a tightly adhering organic film material and a hardened organic finish to ferrous metal strip material comprising passing the ferrous metal strip through at least one solution for improving corrosion resistance containing a source of phosphate ion to deposit a passivating phosphate film thereon having a phosphate content of about 5–10 mgs./100 sq. feet, applying a coating of heat-curable adhesive composition for the organic film material on a first surface area of the ferrous metal strip, at least the first surface area containing the phosphate film thereon, the ferrous metal strip having a thickness of about 0.01–0.04 inch and the coating of adhesive composition having a thickness of about 0.0005–0.001 inch, applying a film-forming heat-hardenable liquid organic finish composition on a second surface area of the ferrous metal strip, the coating of adhesive composition being heat-curable when the ferrous metal strip is heated to a temperature of about 375–425° F., the compositions of the organic finish and the adhesive being such that the coating of liquid organic finish hardens to form a film during a heat-curing cycle for the coating of adhesive composition, curing the adhesive and hardening the organic finish by passing the ferrous metal strip into a zone maintained at an elevated temperature and heating the ferrous metal strip to a temperature of about 375–425° F., applying organic film material having a thickness of about 0.004–0.020 inch on at least a portion of the surface area of the ferrous metal strip having cured adhesive thereon while the strip is at a temperature of about 375–425° F. and with pressure to adhere the organic film material to the ferrous metal strip, the pressure being about 40–100 lbs. p.s.i., and cooling the ferrous metal strip.

9. A method of applying a tightly adhering vinyl film and a hardened organic finish to heat-resistant sheet material comprising applying a heat-curable adhesive composition for vinyl film on a first surface area of the sheet material, applying a film-forming heat-hardenable liquid organic finish composition on a second surface area of the sheet material, the compositions of the organic finish and the adhesive being such that the liquid organic finish hardens to form a film during a heat-curing cycle for the adhesive composition, curing the adhesive and hardening the organic finish by heating the sheet material to an elevated temperature, applying vinyl film on at least a portion of the surface area of the sheet material having cured adhesive thereon at elevated temperature and under pressure to adhere the vinyl film to the sheet material, and cooling the sheet material.

10. A method of applying a tightly adhering vinyl film and a hardenable organic finish to metal sheet material comprising applying a heat-curable adhesive composition for the vinyl film on a first surface area of the metal sheet material, applying a film-forming heat-hardenable liquid organic finish composition on a second surface area of the metal sheet material, the compositions of the organic finish and the adhesive being such that the liquid organic finish hardens to form a film during a heat-curing cycle for the adhesive composition, curing the adhesive and hardening the organic finish by heating the metal sheet material to an elevated temperature, applying the vinyl film on at least a portion of the surface area of the metal sheet material having a cured adhesive thereon at elevated temperature and under pressure to adhere the vinyl film to the metal sheet material, and cooling the metal sheet material.

11. A method of applying a tightly adhering vinyl film and a hardenable organic finish to metal sheet material comprising applying a heat-curable adhesive composition for the vinyl film on a first surface area of the metal sheet material, applying a film-forming heat-hardenable liquid organic finish composition on a second surface area of the metal sheet material, the compositions of the organic finish and the adhesive being such that the liquid organic finish hardens to form a film during a heat-curing cycle for the adhesive composition upon heating at a temperature of about 400–650° F., curing the adhesive and hardening the organic finish by heating the metal sheet material in a zone maintained at a temperature of about 400–650° F., applying the vinyl film on at least a portion of the surface area of the metal sheet material having cured adhesive thereon at elevated temperature and under pressure to adhere the vinyl film to the sheet material, and cooling the metal sheet material.

12. A method of applying a tightly adhering vinyl film and a hardenable organic finish to metal sheet material comprising applying a coating of heat-curable adhesive composition for the vinyl film on a first surface area of the metal sheet material, applying a film-forming heat-hardenable liquid organic finish composition on a second surface area of the metal sheet material, the compositions of the organic finish and the adhesive being such that the liquid organic finish hardens to form a film during a heat-curing cycle for the coating of the adhesive composition, the coating of adhesive composition being heat-curable when heated for a period of about 30 seconds to 2 minutes in a zone maintained at a temperature of about 400–650° F., curing the adhesive and hardening the organic finish by heating the metal sheet material in a zone maintained at a temperature of about 400–650° F. for a period of about 30 seconds to 2 minutes, applying the vinyl film on at least a portion of the surface area of the metal sheet material having cured adhesive thereon at elevated temperature and under pressure to adhere the vinyl film to the metal sheet material, and cooling the metal sheet material.

13. A method of applying a tightly adhering vinyl film material and a hardenable organic finish to metal sheet material comprising applying a coating of heat-curable adhesive composition for the vinyl film on a first surface area of the metal sheet material, applying a coating of a film-forming heat-hardenable liquid organic finish composition on a second surface area of the metal sheet material, the coating of adhesive composition being heat-curable when the metal sheet material is heated to a temperature of 300–450° F., the compositions of the organic finish and the adhesive being such that the liquid organic finish hardens to form a film during a heat-curing cycle for the coating of adhesive composition, heating the metal sheet material to a temperature of about 300–450° F. to cure the coating of adhesive composition and harden the coating of organic finish, applying vinyl film on at least a portion of the surface area of the metal sheet material having cured adhesive thereon while the temperature of the metal sheet is about 300–450° F. and under pressure to adhere the vinyl film to the metal sheet material, and cooling the metal sheet material.

14. A method of applying a tightly adhering vinyl film and a hardened organic finish to ferrous metal sheet material comprising applying a passivating phosphate film having a thickness of about 3–100 mgs./100 sq. ft. on the ferrous metal sheet material, applying a coating of heat-curable adhesive composition for the vinyl film on a first surface area of the ferrous metal sheet material, the phosphate film being applied to at least the first surface area, the ferrous metal sheet material having a thickness of about 0.010–0.040 inch and the applied coating of adhesive material having a thickness of about 0.0005–0.001 inch, applying a coating of a film-forming heat hardenable liquid organic finish composition on a second surface area of the ferrous sheet material, the coating of adhesive composition being heat-curable when the ferrous metal sheet material is heated to a temperature of about 300–450° F., the compositions of the organic finish and the adhesive being such that the coating of heat-hardenable liquid organic finish hardens to form a film during a heat-curing cycle for the adhesive composition, curing the coating of adhesive and hardening the coating of organic finish by heating the ferrous metal sheet material to a temperature of about 300–450° F., applying vinyl film having a thickness of about 0.004–0.020 inch on at least a portion of the surface area of the ferrous metal sheet material having cured adhesive thereon while at a temperature of about 300–450° F. and under pressure to adhere the vinyl film to the sheet material, and cooling the ferrous metal sheet material.

15. A method of applying a tightly adhering vinyl film and a hardened organic finish to metal sheet material comprising applying a coating of heat-curable adhesive composition for the vinyl film on a first surface area of the metal sheet material, applying a coating of a film-forming heat-hardenable liquid organic finish composition on a second surface area of the metal sheet material, the adhesive composition being heat-curable when the metal sheet material is heated to a temperature of about 375–425° F., the compositions of the organic finish and the adhesive being such that the liquid organic finish hardens to form a film during a heat-curing cycle for the adhesive composition, curing the adhesive and hardening the organic finish by heating the metal sheet material to a temperature of about 375–425° F., applying vinyl film on at least a portion of the surface area of the metal sheet material having cured adhesive thereon while the metal sheet is at a temperature of about 375–425° F. and under pressure to adhere the vinyl film to the metal sheet material, and cooling the metal sheet material.

16. A method of applying a tightly adhering vinyl film and a hardened organic finish to metal sheet material comprising applying a coating of heat-curable adhesive composition for the vinyl film on a first surface area of the metal sheet material, the metal sheet material having a thickness of about 0.01–0.04 inch and the applied coating of adhesive composition having a thickness of about 0.0005–0.001 inch, applying a coating of a film-forming heat-hardenable liquid organic finish composition on a second surface area of the metal sheet material, the coating of adhesive composition being heat-curable when the metal strip material is heated to a temperature of about 375–425° F., the compositions of the organic finish and the adhesive being such that the coating of liquid organic finish hardens to form a film during a heat-curing cycle for the coating of adhesive composition, curing the adhesive and hardening the organic finish by heating the metal sheet material to a strip temperature of about 375–425° F., applying vinyl film having a thickness of about 0.004–0.020 inch on at least a portion of the surface area of the metal sheet material having cured adhesive thereon while the metal sheet is at a temperature of about 375–425° F. and under pressure to adhere the vinyl film to the metal sheet material, and cooling the metal sheet material.

17. A method of applying a tightly adhering vinyl film and a hardened organic finish to ferrous metal strip comprising passing the ferrous metal strip through at least one solution for improving corrosion resistance containing a source of phosphate ion to deposit a passivating phosphate film thereon having a phosphate content of about 5–10 mgs./100 sq. feet, applying a coating of heat-curable adhesive composition for the vinyl film on a first surface area of the ferrous metal strip, at least the first surface area containing the phosphate film thereon, the ferrous metal strip having a thickness of about 0.01–0.04 inch and the coating of adhesive composition having a thickness of about 0.0005–0.001 inch, applying a film-forming heat-hardenable liquid organic finish composition on a second surface area of the ferrous metal strip, the coating of adhesive composition being heat-curable when the ferrous metal strip is heated to a temperature of about 375–425° F., the compositions of the organic finish and the adhesive being such that the coating of liquid organic finish hardens to form a film during a heat-curing cycle for the coating of adhesive composition, passing the ferrous metal strip into a zone maintained at an elevated temperature to heat the ferrous metal strip to a temperature of about 375–425° F. and to cure the adhesive and harden the organic finish, applying vinyl film having a thickness of about 0.004–0.020 inch on at least a portion of the surface area of the ferrous metal strip having cured adhesive thereon while the strip is at a temperature of about 375–425° F. and with pressure to adhere the vinyl film to the ferrous metal strip, the pressure being about 40–100 lbs. p.s.i., and cooling the ferrous metal strip.

18. A method of applying a coating of cured adhesive on a surface area of heat resistant sheet material and a hardened organic finish on a different surface area thereof comprising the steps of applying a heat-curable adhesive composition on a first surface area of the sheet material, applying a film-forming heat-hardenable liquid organic finish composition on a second surface area of the sheet material, the compositions of the organic finish and the adhesive being such that the liquid organic finish hardens to form a film during a heat-curing cycle for the adhesive composition, and simultaneously curing the adhesive and hardening the organic finish by heating the sheet material to an elevated temperature 19. A method of applying a coating of cured adhesive on a surface area of metal sheet material and a hardened organic finish on a different surface area thereof comprising the steps of applying a heat-curable adhesive composition on a first surface area of the metal sheet material, applying a heat-hardenable organic finish composition on a second surface area of the metal sheet material, the compositions of the organic finish and the adhesive being such that the organic finish hardens during a heat-curing cycle for the adhesive composition, and simultaneously curing the adhesive and hardening the organic finish by heating the metal sheet material to an elevated temperature.

References Cited in the file of this patent

UNITED STATES PATENTS

| | | |
|---|---|---|
| 2,070,600 | Jenett | Feb. 16, 1937 |
| 2,412,528 | Morrell | Dec. 10, 1946 |
| 2,728,703 | Kiernan et al. | Dec. 27, 1955 |

UNITED STATES PATENT OFFICE
CERTIFICATE OF CORRECTION

Patent No. 3,032,459                                May 1, 1962

Arthur E. Uhleen

It is hereby certified that error appears in the above numbered patent requiring correction and that the said Letters Patent should read as corrected below.

Column 8, line 5, for "Part" read -- Parts --; column 10, line 24, after "form" insert -- a film --; column 15, line 5, before "heat-hardenable" insert -- film-forming --; same line 5, before "organic" insert -- liquid --; line 8, before "organic" insert -- liquid --; same line 8, after "harde insert -- to form a film --.

Signed and sealed this 31st day of July 1962.

(SEAL)
Attest:

ERNEST W. SWIDER                               DAVID L. LADD
Attesting Officer                                  Commissioner of Patents